(12) United States Patent
Hu et al.

(10) Patent No.: US 9,230,587 B1
(45) Date of Patent: Jan. 5, 2016

(54) AIR BEARING SURFACE DESIGN WITH EXTREME PARTICLE TRAPPING HOLES FOR IMPROVING HDD PARTICLE ROBUSTNES

(71) Applicant: HGST Netherlands B.V., Amsterdam (NL)

(72) Inventors: Yong Hu, San Ramon, CA (US); Weidong Huang, Palo Alto, CA (US); Katsuhide Tanaka, Hiratsuka (JP)

(73) Assignee: HGST NETHERLANDS B.V., Amsterdam (NL)

( * ) Notice: Subject to any disclaimer, the term of this patent is extended or adjusted under 35 U.S.C. 154(b) by 0 days.

(21) Appl. No.: 14/640,684

(22) Filed: Mar. 6, 2015

(51) Int. Cl.
 *G11B 5/60* (2006.01)
 *G11B 21/21* (2006.01)
 *G11B 33/14* (2006.01)

(52) U.S. Cl.
 CPC .......... *G11B 5/6082* (2013.01); *G11B 33/1446* (2013.01)

(58) Field of Classification Search
 None
 See application file for complete search history.

(56) References Cited

U.S. PATENT DOCUMENTS

| | | | |
|---|---|---|---|
| 5,490,025 A | 2/1996 | Dorius et al. | |
| 5,831,792 A | 11/1998 | Ananth | |
| 5,926,343 A | 7/1999 | Dorius et al. | |
| 6,920,015 B2 | 7/2005 | Mundt et al. | |
| 7,525,763 B2 | 4/2009 | Yao et al. | |
| 7,760,468 B2 | 7/2010 | Cha et al. | |
| 8,139,323 B2 * | 3/2012 | Huha et al. | 360/234.3 |
| 8,199,437 B1 | 6/2012 | Sun et al. | |
| 8,488,278 B2 | 7/2013 | Kunkel et al. | |
| 8,493,688 B2 | 7/2013 | Ambekar et al. | |

OTHER PUBLICATIONS

J. Tribol, Slider Designs for Controlling Contamination, ASME DC, Journal of Tribology, 119(3), (Jul. 1, 1997).
J. L. Brand, "Designing, Modeling, and Testing Particle Robuse air Bearings for Perpendicular Recording Media," Magnetics, IEEE Transactions on, vol. 43, No. 9, Sep. 2007. http://ieeexplore.ieee.org/stamp/stamp.jsp?tp=&arnumber=4292276&isnumber=4292269.

* cited by examiner

*Primary Examiner* — Craig A. Renner
(74) *Attorney, Agent, or Firm* — Patterson & Sheridan, LLP

(57) ABSTRACT

Embodiments disclosed herein generally relate to a head slider within disk drive data storage devices. A head slider comprises a head body having a leading portion on a leading edge and a trailing portion on a trailing edge. The leading portion includes a first leading pad disposed at the MFS and a second leading pad disposed between the first leading pad and the leading edge. The second leading pad is recessed a first vertical distance from the MFS. One or more particle trapping holes are disposed between the first leading pad and the second leading pad. The one or more particle trapping holes are recessed a second vertical distance from the MFS, the second vertical distance being greater than the first vertical distance. Particles encountered by the leading portion may be suctioned into the one or more particle trapping holes, preventing the particles from building-up onto the MFS.

12 Claims, 9 Drawing Sheets

AIR BEARING SURFACE DESIGN WITH EXTREME PARTICLE TRAPPING HOLES FOR IMPROVING HDD PARTICLE ROBUSTNES

BACKGROUND

1. Field

Embodiments disclosed herein generally relate to head sliders within disk drive data storage devices.

2. Description of the Related Art

In an electronic data storage and retrieval system, a magnetic head typically includes a read/write transducer for retrieving and storing magnetically encoded information on a magnetic recording medium or disk. A suspended head slider supports the magnetic head. In operation, the head slider rides on a cushion or bearing of air above the surface of the disk as the disk is rotating at its operating speed. The head slider includes a media facing surface (MFS), such as an air bearing surface (ABS), designed to generate an air bearing force that counteracts a preload bias urging the head slider toward the disk. The head slider flies above and out of contact with the disk at a fly height as a result of the MFS.

Several problems with head sliders are encountered that affect fly height negatively. One major problem head sliders encounter is particle build-up. Particle build-up occurs in both sealed helium hard disk drives (HDD) and air HDDs. In sealed helium HDDs, there is a significantly less pressure gradient at the trailing edge, which causes little to no backflow at the trailing edge. Less pressure gradient also means less particle mobility, and as such, there is a high risk of particles scratching and/or embedding on the disk. Since there is little particle mobility, the particles tend to build-up on the head slider, causing the particles to touch down on the disk. When the particles touch down on the disk, the particles may scratch the disk, or may be embedded into the disk, causing detrimental system errors.

Therefore, an improved head slider that is less prone to particle induced failures with maximized particle robustness is needed.

SUMMARY

Embodiments disclosed herein generally relate to a head slider within disk drive data storage devices. A head slider comprises a head body having a leading portion on a leading edge and a trailing portion on a trailing edge. The leading portion includes a first leading pad disposed at the MFS and a second leading pad disposed between the first leading pad and the leading edge. The second leading pad is recessed a first vertical distance from the MFS. One or more particle trapping holes are disposed between the first leading pad and the second leading pad. The one or more particle trapping holes are recessed a second vertical distance from the MFS, the second vertical distance being greater than the first vertical distance. Particles encountered by the leading portion may be suctioned into the one or more particle trapping holes, preventing the particles from building-up onto the MFS.

In one embodiment, a head slider comprises a head body having a leading edge, a trailing edge and a MFS. The MFS has a trailing portion, the trailing portion having first and second side pads disposed at the MFS, and a leading portion having a first leading pad disposed at the MFS. The head body also has a second leading pad disposed between the leading edge and the first leading pad, the second leading pad at least partially surrounding the first leading pad, wherein the second leading pad is disposed at a first surface recessed a first vertical distance from the MFS. One or more particle trapping holes are disposed between the first leading pad and the second leading pad.

In another embodiment, a magnetic recording system comprises an actuator, an actuator arm coupled to the actuator, a slider coupled to the actuator arm, and a head slider coupled to the slider. The head slider comprises a head body having a leading edge, a trailing edge and a MFS. The MFS has a trailing portion, the trailing portion having first and second side pads disposed at the MFS, and a leading portion having a first leading pad disposed at the MFS. The head body also has a second leading pad disposed between the leading edge and the first leading pad, the second leading pad at least partially surrounding the first leading pad, wherein the second leading pad is disposed at a first surface recessed a first vertical distance from the MFS. One or more particle trapping holes are disposed between the first leading pad and the second leading pad.

BRIEF DESCRIPTION OF THE DRAWINGS

So that the manner in which the above recited features discussed herein can be understood in detail, a more particular description of the above may be had by reference to embodiments, some of which are illustrated in the appended drawings. It is to be noted, however, that the appended drawings illustrate only typical embodiments and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments. However, it should be understood that the disclosure is not limited to specific described embodiments. Instead, any combination of the following features and elements, whether related to different embodiments or not, is contemplated to implement and practice the disclosure. Furthermore, although the embodiments may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments disclosed herein generally relate to a head slider within disk drive data storage devices. A head slider comprises a head body having a leading portion on a leading edge and a trailing portion on a trailing edge. The leading portion includes a first leading pad disposed at the MFS and a second leading pad disposed between the first leading pad and the leading edge. The second leading pad is recessed a first vertical distance from the MFS. One or more particle trapping holes are disposed between the first leading pad and the second leading pad. The one or more particle trapping holes are recessed a second vertical distance from the MFS, the second vertical distance being greater than the first vertical distance. Particles encountered by the leading portion may be suctioned into the one or more particle trapping holes, preventing the particles from building-up onto the MFS.

Figure 1:
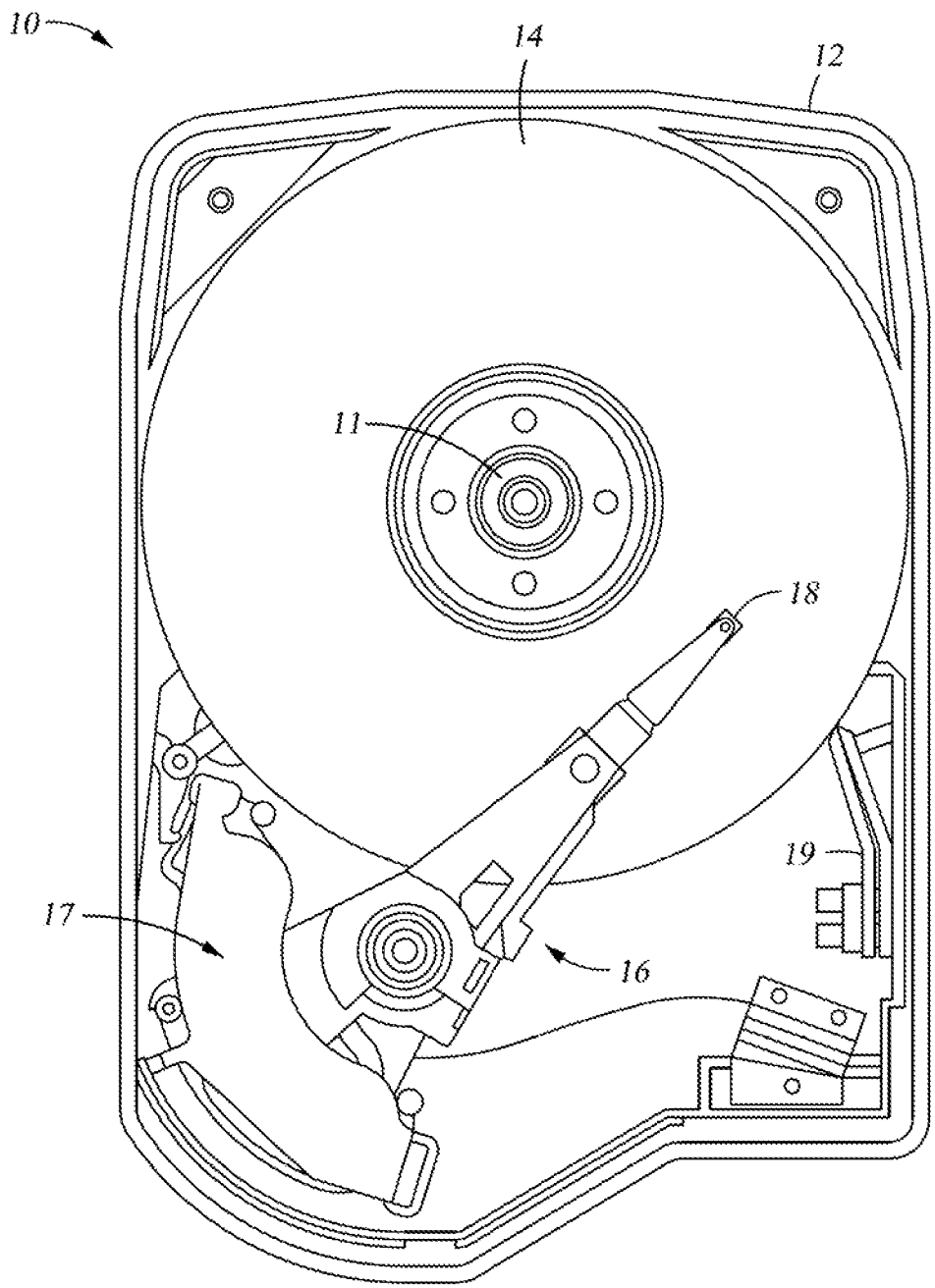
FIG. 1 shows an exemplary disk drive having a magnetic disk, and a head slider mounted on an actuator, according to one embodiment.

FIG. 1 shows one embodiment of a magnetic hard disk drive (HDD) 10 that includes a housing 12 within which a magnetic disk 14, or media, is fixed to a spindle 11 and a spindle motor (SPM) by a clamp. In one embodiment, the HDD 10 is a sealed helium HDD. In another embodiment, the HDD 10 is a sealed air HDD. The SPM drives the magnetic disk 14 to spin at a certain speed. A head slider 18 accesses a recording area of the magnetic disk 14. The head slider 18 has a head element section and a slider to which the head element section is fixed. The head slider 18 is provided with a fly-height control which adjusts the flying height of the head above the magnetic disk 14. An actuator 16 carries the head slider 18. In FIG. 1, the actuator 16 is pivotally held by a pivot shaft, and is pivoted around the pivot shaft by the drive force of a voice coil motor (VCM) 17 as a drive mechanism. The actuator 16 is pivoted in a radial direction of the magnetic disk 14 to move the head slider 18 to a desired position. Due to the viscosity of air between the spinning magnetic disk 14 and the head slider's MFS facing the magnetic disk 14, a pressure acts on the head slider 18. The head slider 18 flies low above the magnetic disk 14 as a result of this pressure balancing between the air and the force applied by the actuator 16 toward the magnetic disk 14. In some embodiments, the head slider 18 may have raised areas or portions (such as pads) that actually contact disk 14, as opposed to the slider head "flying" over the disk 14. In some embodiments, the disk drive 10 may include a ramp 19, where the head slider 18 is parked when the disk drive 10 is not in operation and disk 14 is not rotating. The magnetic hard disk drive 10 illustrated in FIG. 1 may be any magnetic recording system, and is not limited to being a hard disk drive. Further, the MFS may be an ABS.

Figure 2:
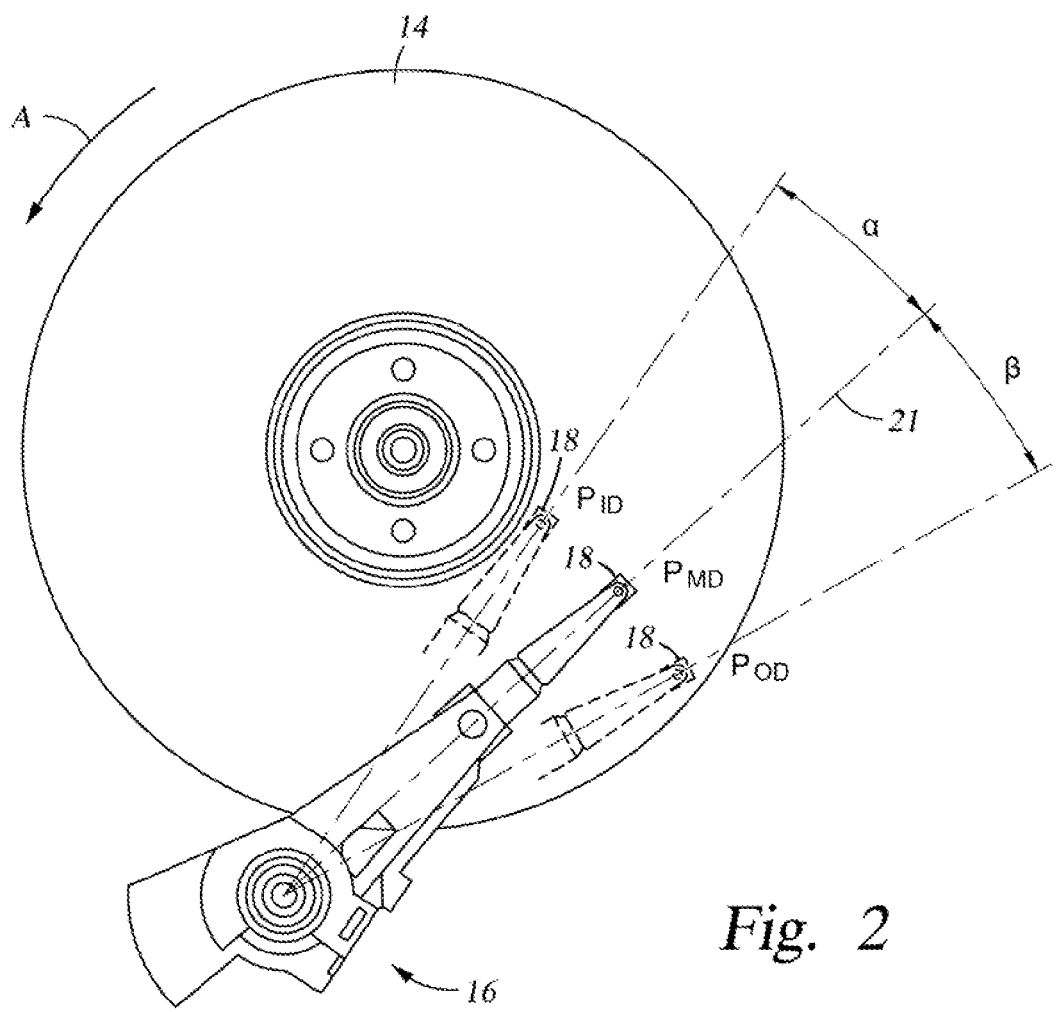
FIG. 2 is a diagram showing skew angles of the head slider at different positions with respect to the magnetic disk.

FIG. 2 is a diagram showing skew angles of the head slider 18 at different positions with respect to the magnetic disk 14. Actuator arm 16 supports the head slider 18 above the surface of the magnetic disk 14 at locations including an inner diameter (ID) position $P_{ID}$, an outer diameter (OD) position $P_{OD}$ and positions between $P_{ID}$ and $P_{OD}$. As the disk 14 spins, it produces airflow in a direction tangential to the disk in the direction the disk spins, as shown by arrow A. When the head slider 18 is at the mid-disk position $P_{MD}$, the centerline 21 of the head slider 18 is approximately aligned with the direction of the airflow produced by the disk 14, and the skew angle is therefore 0 (zero). When the head slider 18 is at other positions over the disk, however, the centerline 21 of the head slider 18 is not aligned with the direction of the airflow produced by the disk 14, and the angle of misalignment is known as the skew angle. As shown in FIG. 2, when the head slider is at the ID position $P_{ID}$, the skew angle is α, which is the maximum skew angle in the ID direction, and when the head slider is at the OD position $P_{OD}$, the skew angle is β, which is the maximum skew angle in the OD direction. The skew angle affects the aerodynamic characteristics of the head slider MFS. Generally, the greater the skew angle, the lower the lift produced for a given airflow velocity. In addition, the airflow velocity produced by the spinning disk 14 is dependent on the distance from the center of the disk. At head slider fly heights, the tangential airflow produced by the disk is very close to the tangential velocity of the disk. This tangential velocity is equal to (RPM)×2πR, where RPM is the rotations per minute of the disk, and R is the distance from the head slider location to the center of the disk.

Figure 3:
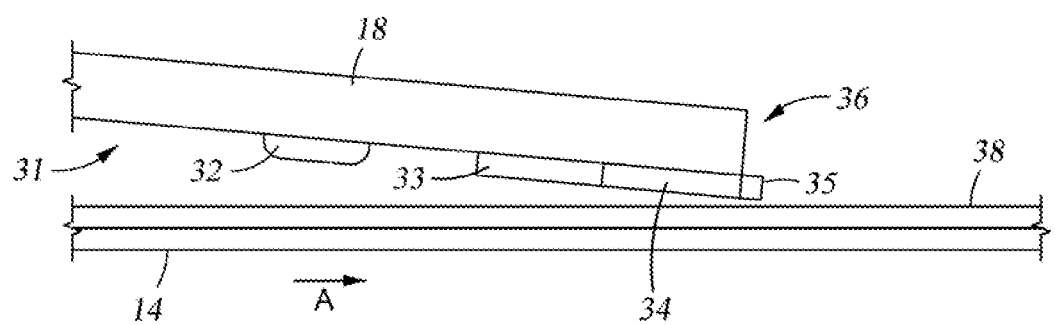
FIG. 3 is a side view of the head slider and magnetic disk of the disk drive of FIG. 1, according to one embodiment.

FIG. 3 is a side view of the head slider 18 and the magnetic disk 14 of FIG. 1. Magnetic disk 14 is moving in the direction of arrow A, (as also shown in FIG. 2), and causes airflow in the same direction. This airflow flows over the MFS 31 of the head slider 18 and produces the lifting pressure described above. In one embodiment, head slider 18 includes raised areas such as front pad 32, side pads 33 and trailing pad 34. Trailing pad 34, located adjacent to and centered relative to, the trailing edge 36 of the head slider 18, may further include the read/write head 35 that writes and reads data to and from magnetic disk 14. Disk 14 has a lubricant 38 on its upper surface to protect the disk 14 from contact with the head slider 18 and/or other components of the disk drive.

Figure 4:
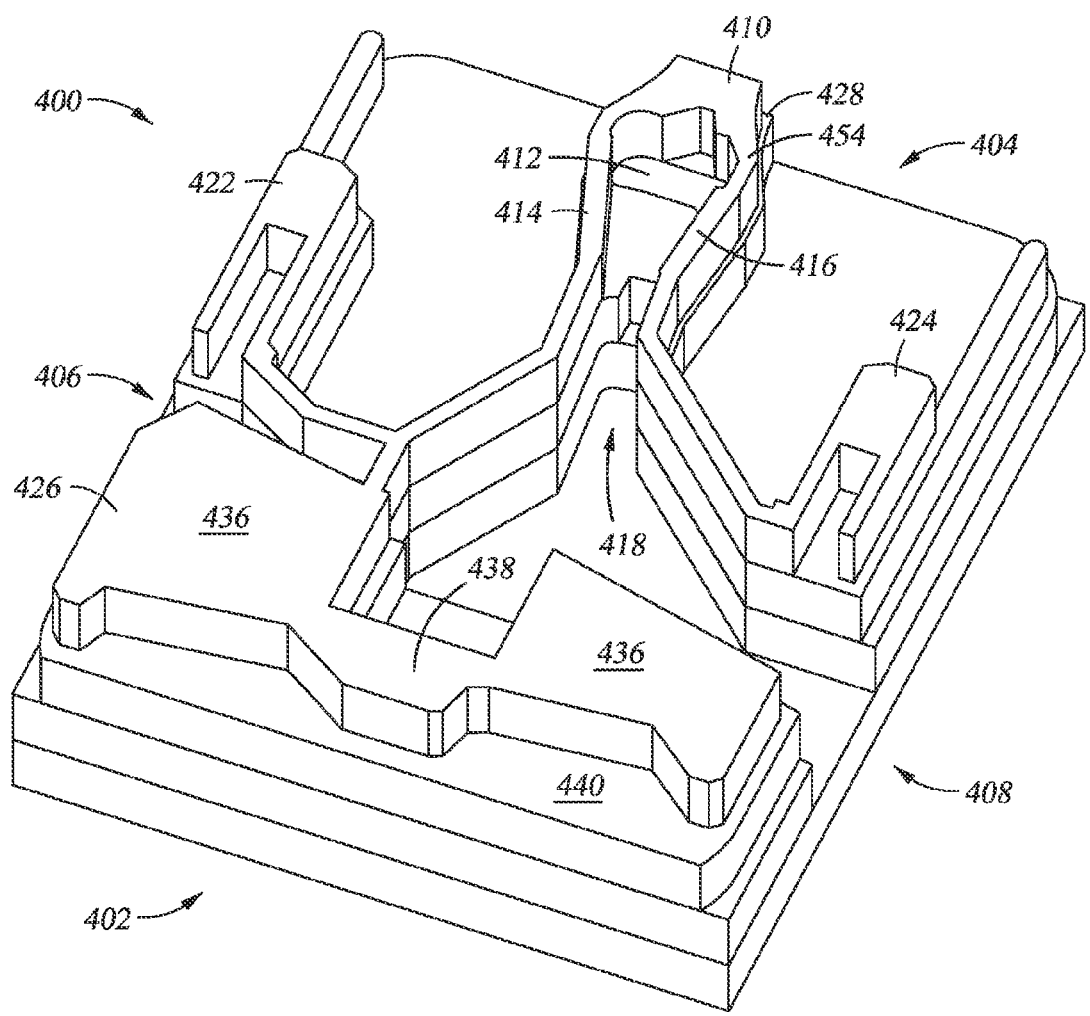
FIG. 4 is an isometric view of the bottom of a conventional slider head body used to make used to make one embodiment of a conventional head slider.

FIG. 4 is an isometric view of the bottom of a conventional head slider 400 according to one embodiment. The head slider 400 comprises a head body including a leading edge 402, a trailing edge 404, first 406 and second 408 side edges and an MFS (the bottom surface of head slider 400). In one embodiment, head slider 400 is the head slider 18 of FIGS. 1-3, and the MFS of head slider 400 is the MFS 31 of head slider 18 which faces the magnetic disk 14 in FIG. 3. A trailing pad 410 is adjacent to the trailing edge 404 of the head slider 400, and substantially centered relative to the trailing edge 404. First 422 and second 424 side pads are adjacent to the first 406 and second 408 side edges of the head slider 400, respectively. In some embodiments, as shown, side pads 422 and 424 have a substantially "U" shaped configuration, with the open part of the U facing the leading edge 402 of the head slider 400. According to some embodiments, trailing pad 410 has a read/write head 428 mounted thereon, on the rear portion of the trailing pad adjacent to the trailing edge 404 of the head slider 400.

The MFS also has a first leading pad 426 adjacent to the leading edge 402 of the head slider 400. The first leading pad 426 includes two relatively wide side portions 436 that are connected by a relatively narrow bridge portion 438. The bridge portion 438 is closer to the leading edge 402 of the head slider than the side portions 436. A second leading pad 440 is disposed between the first leading pad 426 and the leading edge 402 of the head slider 400, and the second leading pad 440 is in contact with the first leading pad 426. The second leading pad is recessed a vertical distance below the MFS. First 414 and second 416 arms are connected to the sides of the trailing pad 410 and extend towards the leading edge 402 of the head slider 400. The trailing pad 410, the first arm 414 and the second arm 416 together form a tail section 454 of the trailing portion 412 of the head slider. Between the first 414 and second 416 arms is a longitudinal channel 418. In some embodiments, the first 414 and second 416 arms connect the first 422 and second 424 side pads, respectively, to the trailing pad 410. The portion of the arms 414 and 416 closest to the trailing pad 410, extend towards the leading edge of the head slider as described above. As the arms 414 and 416 extend further from the trailing pad 410, the arms 414, 416 form an arc toward the side edges 406 and 408 of the head slider and connect to the inner top portion of the U-shaped side pads 422 and 424, respectively.

Figure 5A:
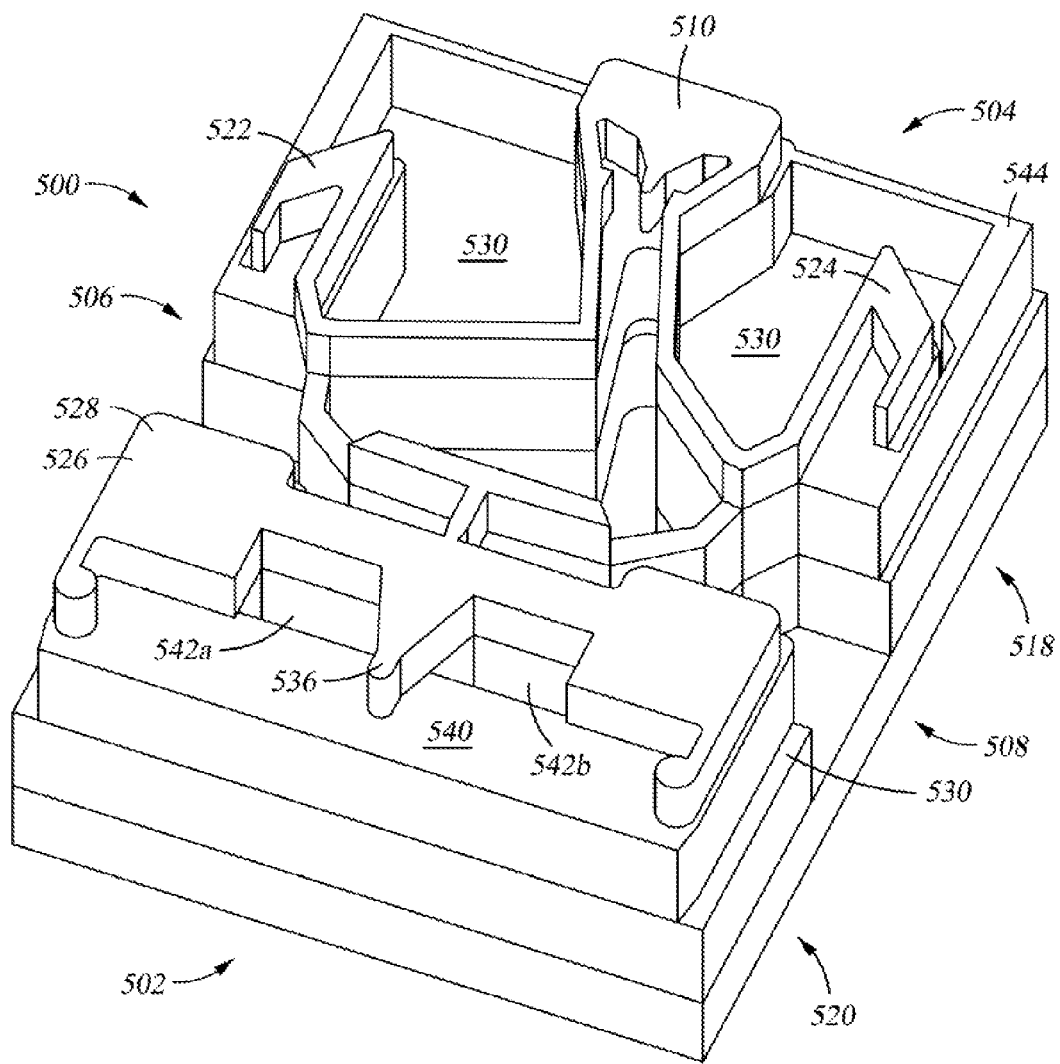
FIGS. 5A-5B illustrate a particle trapping head slider body according to one embodiment.
Figure 5B:
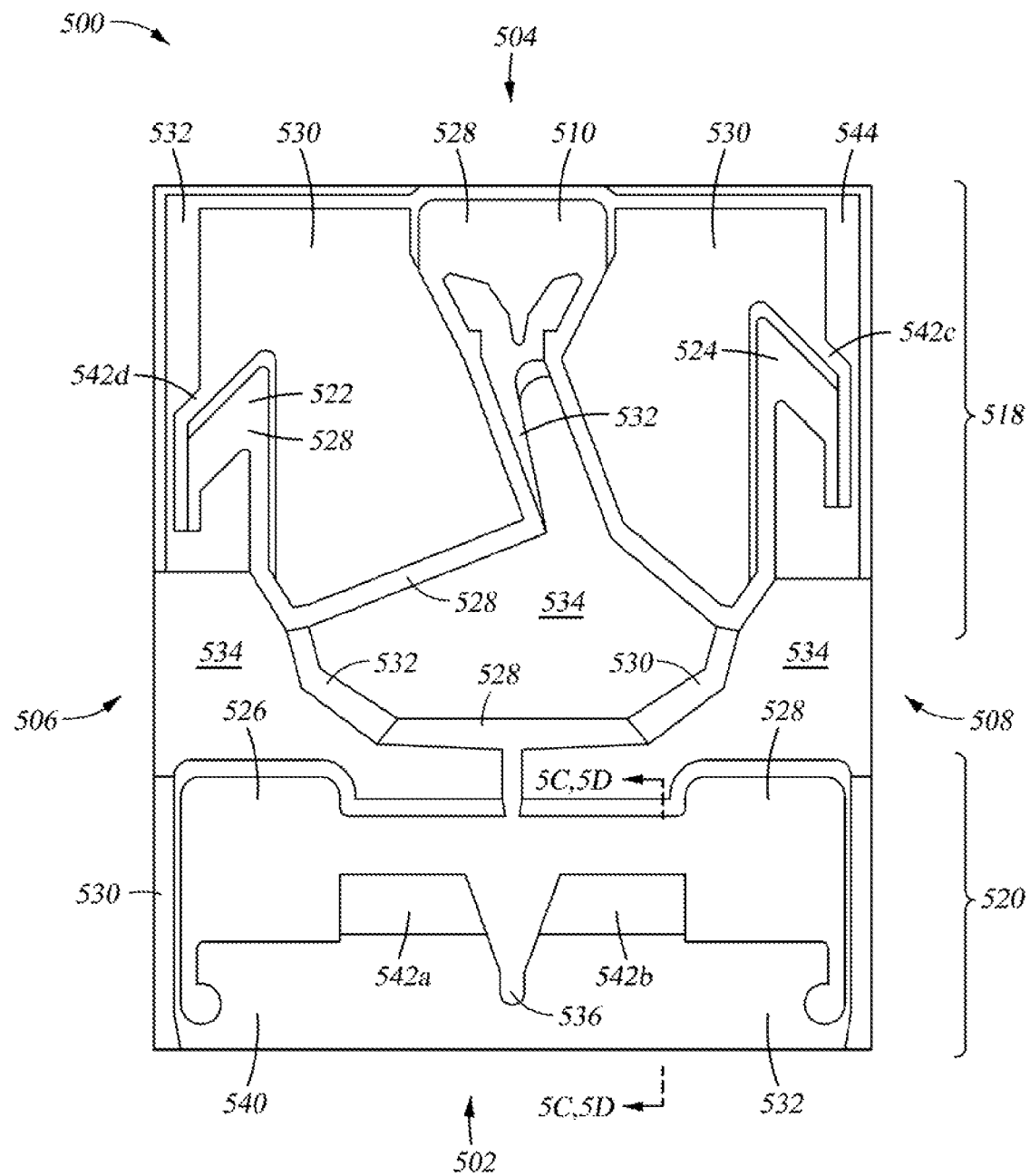

FIG. 5A is an isometric view of the bottom of a particle trapping head slider 500 according to one embodiment. FIG. 5B is an overhead view of FIG. 5A. The head slider 500 has a body including a leading edge 502, a trailing edge 504, first 506 and second 508 side edges and an MFS 528 (the bottom surface of head slider 500 as shown oriented upwards in FIG. 5B). In one embodiment, the head slider 500 is the head slider 18 of FIGS. 1-3, and the MFS 528 of head slider 500 is the MFS 31 of head slider 18 which faces the magnetic disk 14 in FIG. 3. In another embodiment, the head slider 500 is used in a sealed helium HDD. The head slider 500 further includes a trailing portion 518 and a leading portion 520. The trailing portion 518 includes a trailing pad 510. The trailing pad 510 is adjacent to the trailing edge 504 of the head slider 500, and substantially centered relative to the trailing edge 504. First 522 and second 524 side pads are adjacent to the first 506 and second 508 side edges of the head slider 500, respectively, and disposed on the trailing portion 518. In some embodiments, as shown, side pads 522 and 524 have a substantially "U" shaped configuration, with the open part of the U facing the leading edge 502 of the head slider 500. A wall 544 may at least partially surround a perimeter of the trailing portion 518 and the first 522 and second 524 side pads. According to some embodiments, trailing pad 510 has a read/write head (not shown) mounted thereon, on the rear portion of the trailing pad adjacent to the trailing edge 504 of the head slider 500.

The leading portion 520 includes a first leading pad 526 adjacent to the leading edge 502 of the head slider 500. The first leading pad 526 is disposed at the MFS 528 and has a front surface. The first leading pad 526 may have a triangular shaped portion 536 positioned substantially central. One tip of the triangular shaped portion 536 points towards the leading edge 502. A second leading pad 540 is disposed between the first leading pad 526 and the leading edge 502. The second leading pad 540 at least partially surrounds the first leading pad 526. In one embodiment, the second leading pad 540 surrounds the first leading pad 526 on three sides, the leading edge 502 side, and on the first 506 and second 508 side edges. The second leading pad 540 is disposed at a first surface 532 recessed a first vertical distance from the MFS 528. In one embodiment, the first vertical distance is between about 0.05 µm and 0.5 µm. A second surface 530 recessed a second vertical distance from the MFS at least partially surrounds the second leading pad 540. The second surface 530 may surround the second leading pad 540 on the first 506 and second 508 side edges. The second vertical distance is greater than the first vertical distance. In one embodiment, the second vertical distance is between about 0.5 µm and 3 µm. Between the trailing portion 518 and the leading portion 520 is a third surface 534. The third surface 534 is recessed a third vertical distance from the MFS 528. The third vertical distance is greater than the second vertical distance. In one embodiment, the third vertical distance is between about 0.5 µm and 5 µm.

One or more particle trapping holes 542a, 542b are disposed between the first leading pad 526 and the second leading pad 540. The one or more particle trapping holes are disposed at the second surface 530, or the second vertical distance from the MFS 528. The front surface 550 of the first leading pad 526 extends from the MFS 528 to the bottom of the one or more particle trapping holes 542a, 542b. The one or more particle trapping holes 542a, 542b may have a width between about 1 µm and 200 µm. The one or more particle trapping holes 542a, 542b may be disposed adjacent to the triangular shaped portion 536 of the first leading pad 526. In one embodiment, the particle trapping holes 542a, 542b surround the triangular shaped portion 536 of the first leading pad 526. The one or more particle trapping holes 542a, 542b may extend along the leading edge 502 facing side of the first leading pad 526. In one embodiment, the particle trapping holes 542a, 542b may have one or more slanted sides, or inclined sides, to increase the particle removal efficiency. The one or more slanted sides may be steeply slanted at an angle between about 0 degrees and about 75 degrees, allowing particles to rotate, or slip, within the one or more particle trapping holes 542a, 542b when particles encounter the slanted sides. The one or more slanted sides of the one or more particle trapping holes 542a, 542b help prevent particles from scratching or embedding in the media.

Although sealed helium HDDs typically have overall less particles than air HDDs, particles may still interfere and cause failures or errors in a sealed helium HDD. Once a particle reaches the MFS and touches down on the disk or media, the particle can be very difficult to remove or blow off, which can be detrimental to the HDD system. As the disk rotates below the head slider 500, air flows from the leading edge 502 to the trailing edge 504. Thus, any particles in the system move from the leading edge 502 towards the trailing edge 504. Particles in the system may move with the air flow, moving over the second leading pad 540, and being suctioned into the particle trapping holes 542a, 542b. The particles are then effectively trapped within the particle trapping holes 542a, 542b, making the head slider 500 less susceptible to particle induced failures. The one or more particle trapping holes 542a, 542b are disposed on the leading portion 518 to trap particles before the particles reach the first leading pad 526, which is disposed at the MFS 528. Furthermore, the one or more particle trapping holes 542a, 542b are recessed to the second vertical distance to prevent particle build-up. If numerous particles are in the system and the particles build-up in the particle trapping holes 542a, 542b, the particles are less likely to build-up onto the MFS 528 of the first leading pad 526 when the particle trapping holes 542a, 542b are recessed to the second vertical distance. Thus, the one or more particle trapping holes 542a, 542b effectively remove particles from the HDD system by trapping the particles, maximizing HDD particle robustness.

FIG. 5B is an overhead view of the head slider 500 of FIG. 5A. As shown in FIG. 5B, the particle trapping holes 542a, 542b may have a rectangular or trapezoidal shape. In one embodiment, the head slider 500 may have additional particle trapping holes 542c, 542d disposed on the trailing portion 518. The additional particle trapping holes 542c, 542d are disposed between the wall 544 and the first 522 and second 524 side pads. The wall 544 may be disposed at the first vertical distance. The additional particle trapping holes 542c, 542d may be disposed at the second vertical distance. The additional particle trapping holes 542c, 542d may trap any errant particles that the one or more particle trapping holes 542a, 542b fail to trap. The additional particle trapping holes 542c, 542d may have either substantially vertical sides or one or more slanted sides. FIG. 5B also shows an embodiment of the head slider 500 where the second leading pad 540 surrounds the first leading pad 526 on all sides. FIG. 5B further shows the third surface 534 disposed between the trailing portion 518 and the leading portion 520.

Figure 5C:
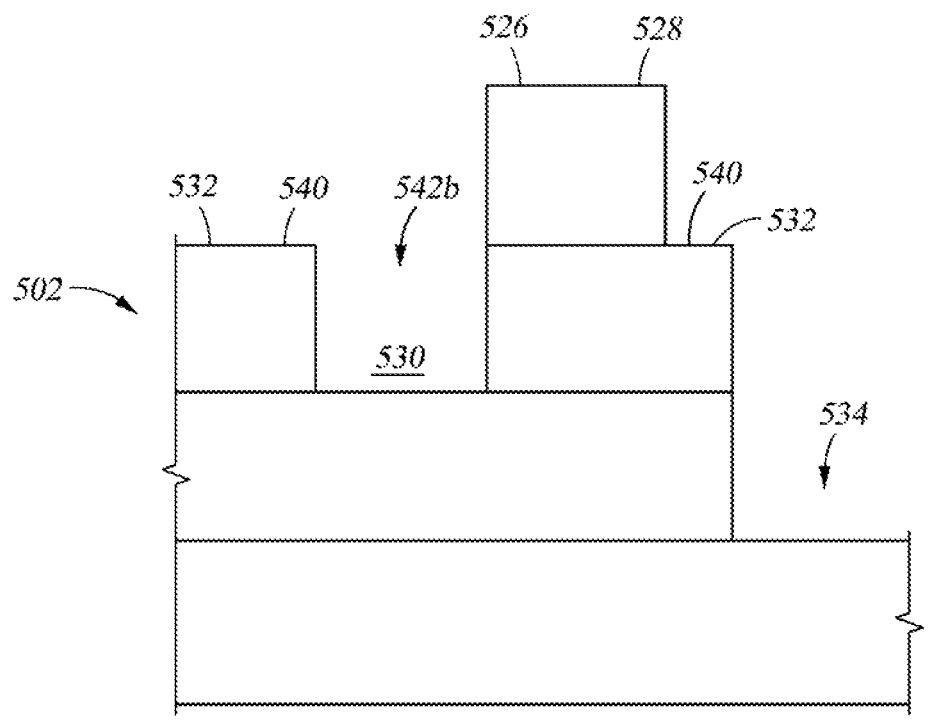
FIG. 5C is a cross section taken through section line 5C-5C of FIG. 5B.

FIG. 5C is a cross section taken through section line 5C-5C of FIG. 5B. FIG. 5C illustrates an embodiment of the one or more particle trapping holes having substantially vertical sides. On the left side of FIG. 5C, the leading edge 502 is shown. The second leading pad 540 is shown at the first surface 532. A particle trapping hole 542b is then shown recessed to the second surface 530. The first leading pad 526 is shown to extend above the particle trapping hole 542b to the MFS 528. The second leading pad 540 is then disposed adjacent to the first leading pad 526 at the first surface 532. The third surface 534 is disposed adjacent the second leading pad 540, the third surface separating the leading portion 520 from the trailing portion 518. The particle trapping hole 542a may have a similar shape with substantially vertical sides like the particle trapping hole 542b. In one embodiment, the one or more particle trapping holes 542a, 542b have substantially identically shapes. It should be noted that, in some embodiments, while the side surfaces are shown as vertical, these side surfaces may be slanted, tapered or undulated, and need not be straight or vertical as shown. Further, it should also be noted that the corners may not be squared off as shown, in some embodiments.

Figure 5D:
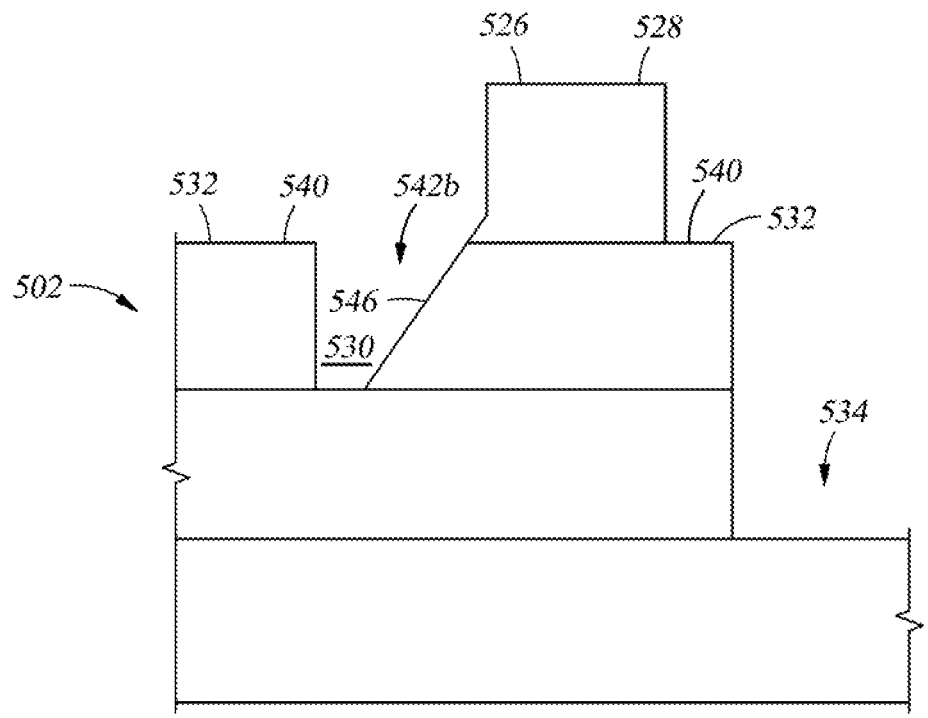
FIG. 5D is a cross section taken through section line 5D-5D of FIG. 5B.

FIG. 5D is a cross section taken through section line 5D-5D of FIG. 5B. FIG. 5D illustrates an embodiment of the one or more particle trapping holes having one or more steeply slanted sides, as discussed above. On the left side of FIG. 5D, the leading edge 502 is shown. The second leading pad 540 is shown at the first surface 532. A particle trapping hole 542b is then shown recessed to the second surface 530. The particle trapping hole 542b is shown with one slanted side 546. The slanted side 546 leads to the first leading pad 526, where the first leading pad 536 is shown to extend above the particle trapping hole 542b and the second leading pad 540 to the MFS 528. The second leading pad 540 is then disposed adjacent to the first leading pad 526 at the first surface 532. The third surface 534 is disposed adjacent the second leading pad 540, the third surface separating the leading portion 520 from the trailing portion 518. The particle trapping hole 542a may have a similar shape with one or more slanted sides like the particle trapping hole 542b. It should be noted that, in some embodiments, while the side surfaces are shown as vertical, these side surfaces may be slanted, tapered or undulated, and need not be straight or vertical as shown. Further, it should also be noted that the corners may not be squared off as shown, in some embodiments.

Figure 6A:
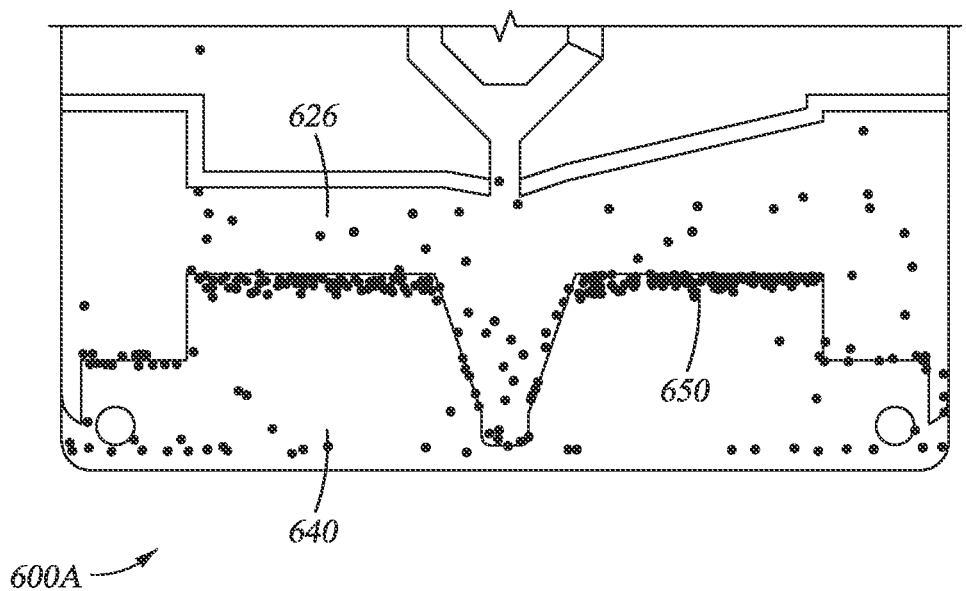
FIG. 6A illustrates the leading end of a conventional head slider having particles in the system.
Figure 6B:
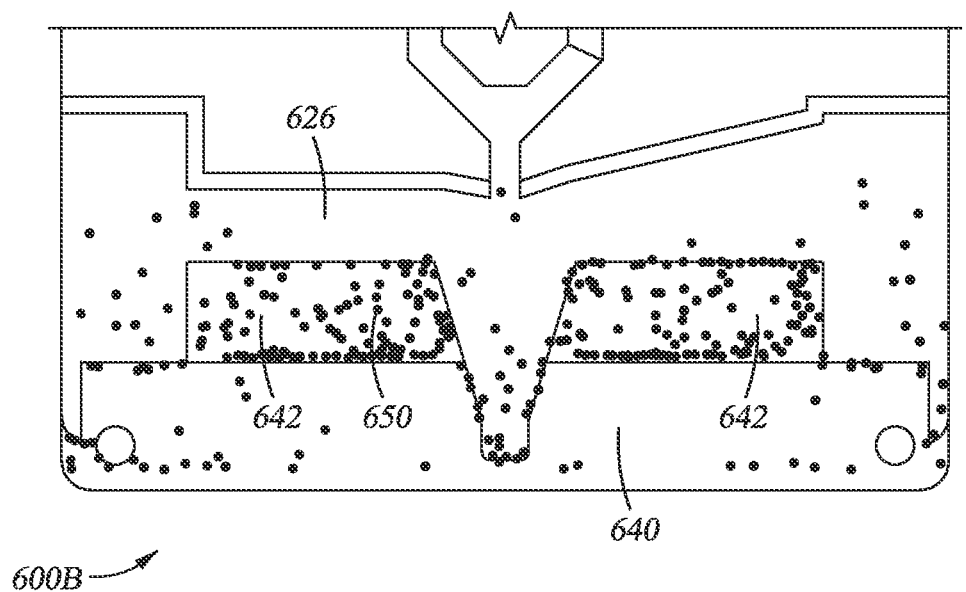
FIG. 6B illustrates the leading end of a particle trapping head slider having particles in the system.

FIGS. 6A and 6B compare particle build-up in a head slider having particle trapping holes and a head slider without particle trapping holes. FIG. 6A illustrates the leading portion 600A of a conventional head slider having no particle trapping holes, such as the conventional head slider 400 shown in FIG. 4. As shown in FIG. 6A, particles 650 build-up at the interface where the first leading pad 626 meets the second leading pad 640. However, the particles 650 are not trapped at the interface between the first 626 and second 640 leading pads, and thus, as the particles 650 build-up, some particles 650 flow onto the first leading pad 626 at the MFS. Therefore, the head slider is more prone to particle induced failures, such as particles scratching and/or embedding in the disk. FIG. 6B illustrates the leading portion 600B of a head slider having particle trapping holes 642 disposed between the first leading pad 626 and the second leading pad 640, such as the head slider 500 of FIGS. 5A and 5B. As shown in FIG. 6B, the majority of the particles 650 are trapped in the particle trapping holes 642. Fewer particles 650 flow on to the first leading pad 626 than in FIG. 6A. Particles 650 are suctioned into the particle trapping holes 642, and are unable to build-up or flow onto the first leading pad 626. Therefore, the head slider is less prone to particle induced failures than the conventional head slider.

Figure 7A:
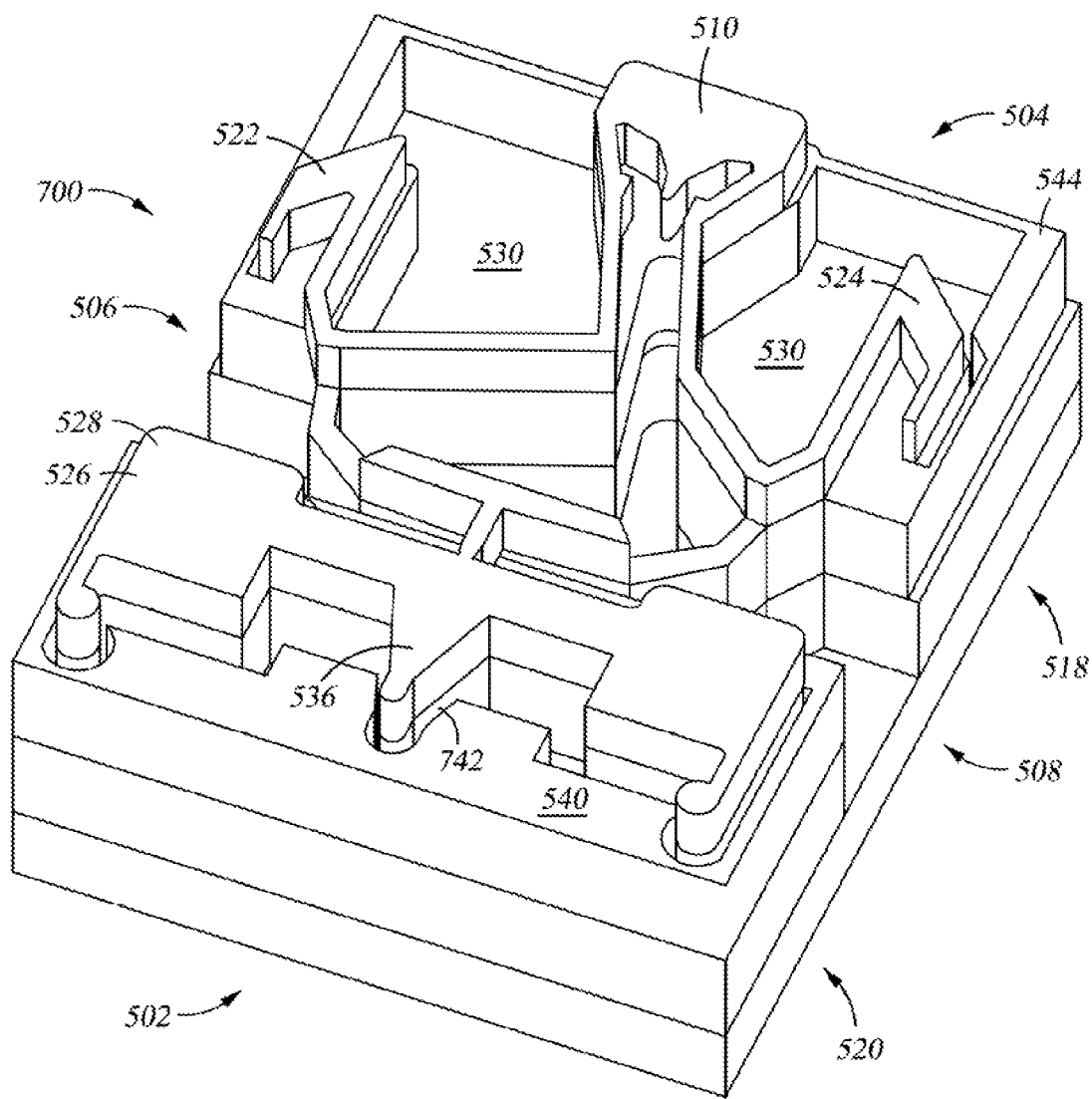
FIGS. 7A-7B illustrate a particle trapping head slider according to another embodiment.
Figure 7B:
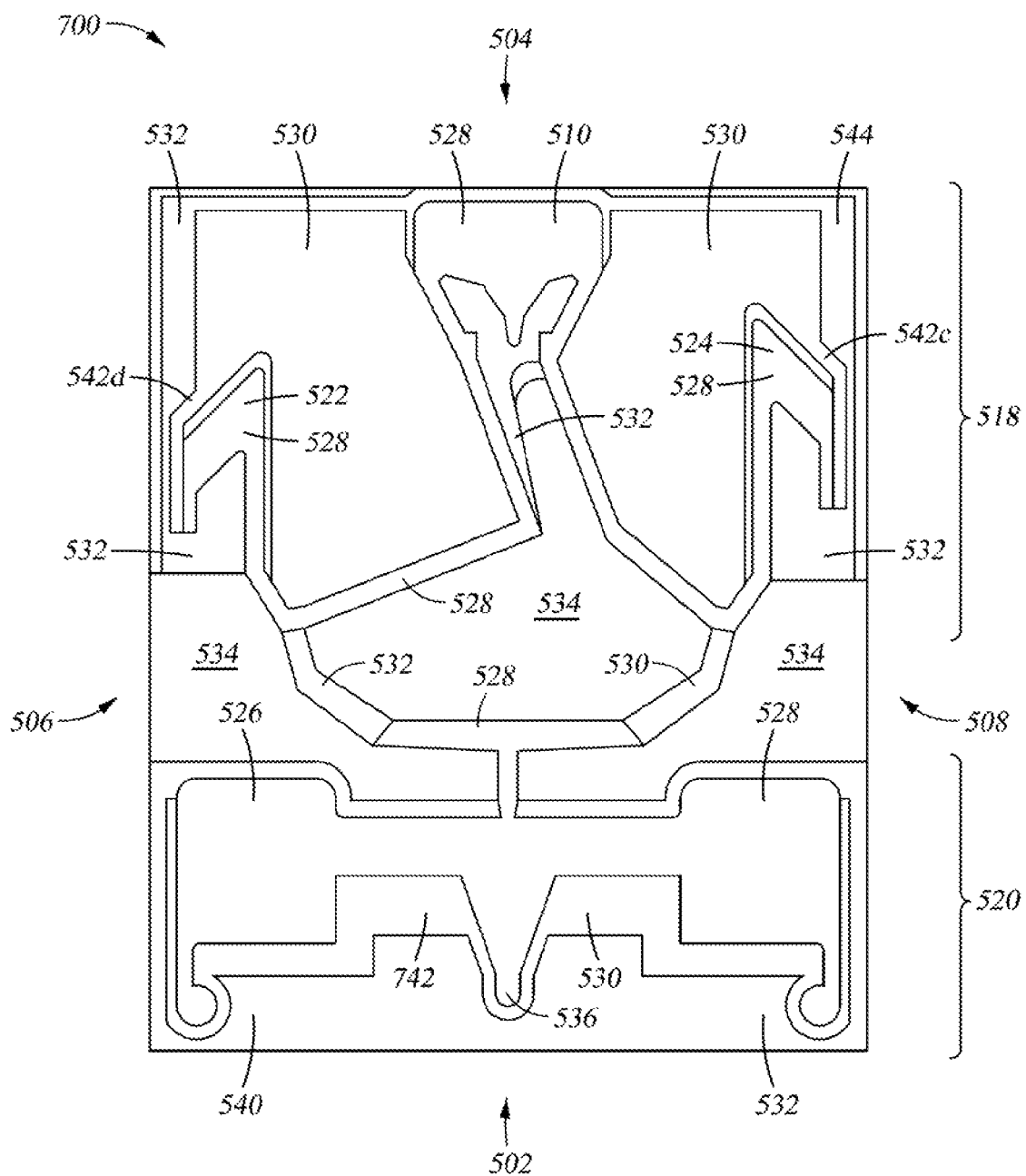

FIG. 7A is an isometric view of head slider 700 according to another embodiment. FIG. 7B is an overhead view of the head slider 700 of FIG. 7A. Head slider 700 may be head slider 500 with the exception of the one or more particle trapping holes 542a, 542b. Common features of FIGS. 5A and 5B are labeled with the same reference designators in FIGS. 7A and 7B. Head slider 700 has one continuous particle trapping hole 742 disposed between the first leading pad 526 and the second leading pad 540. The continuous particle trapping hole 742 is similar to the one or more particle trapping holes 542a, 542b of FIGS. 5A and 5B, but differs in that the continuous particle trapping hole 742 at least partially surrounds the first leading pad 726. In one embodiment, the particle trapping hole 742 may have one or more slanted sides to increase the particle removal efficiency. The continuous particle trapping hole 742 may have either substantially vertical sides, as shown in the particle trapping hole 542b in FIG. 5C, or one or more slanted sides, as shown in the particle trapping hole 542b in FIG. 5D. In one embodiment, the continuous particle trapping hole 742 surrounds the first leading pad 526 on at least three sides, surrounding the first leading pad 526 on the side of the leading edge 502 and on both the first 506 and second 508 side edges. Thus, the continuous particle trapping hole 742 separates the first leading pad 526 from the second leading pad 540 on at least three sides. The continuous particle trapping hole 742 may have shape that mirrors the front surface of the first leading pad 526. The continuous particle trapping hole 742 may be disposed at the second surface 530.

The continuous particle trapping hole 742 is able to trap particles that the leading edge 502 may encounter during operation. The continuous particle trapping hole 742 works in a similar manner to the one or more particle trapping holes 542a, 542b. Particles in the system may move with the air flow, moving over the second leading pad 540, and being suctioned into the continuous particle trapping hole 742. The particles are then effectively trapped within the continuous particle trapping hole 742. Since the first leading pad 526 is surrounded on at least three sides by the continuous particle trapping hole 742, regardless of where particles may flow over the second leading pad 540 or leading edge 502, the particles will first encounter the continuous particle trapping hole 742 before encountering the first leading pad 526. Thus, the particles have less of an opportunity to build-up onto the first leading pad 526, and as a result, the head slider 700 is less prone to particle induced failures and HDD particle robustness can be maximized.

To further reduce the risk of particle induced failures, the head slider 700 may include the additional particle trapping holes 542c, 542d disposed on the trailing portion 518, as shown in FIG. 7B. The additional particle trapping holes 542c, 542d are disposed between the wall 544 and the first 522 and second 524 side pads. The additional particle trapping holes 542c, 542d may be disposed at the second vertical distance. The wall 544 may be disposed at the first vertical distance. The additional particle trapping holes 542c, 542d may trap any errant particles that the continuous particle trapping hole 742 fails to trap.

Overall, including one or more particle trapping holes disposed between the first leading pad and the second leading pad on the leading portion results in a head slider that is less prone to particle induced failures, which improves HDD particle robustness. The one or more particle trapping holes are able to effectively suction particles that may flow over the leading edge and the second leading pad, preventing the particles from building-up or flowing onto the first leading pad at the MFS, further preventing detrimental particle induced failures.

While the foregoing is directed to embodiments of the present disclosure, other and further embodiments of the invention may be devised without departing from the basic scope thereof, and the scope thereof is determined by the claims that follow.

What is claimed is:

1. A head slider, comprising:
 a head body having a leading edge, a trailing edge and a media facing surface, the media facing surface having:
  a trailing portion, the trailing portion having first and second side pads disposed at the media facing surface; and
  a leading portion having a first leading pad disposed at the media facing surface;
 the head body also having a second leading pad disposed between the leading edge and the first leading pad, the second leading pad at least partially surrounding the first leading pad, wherein the second leading pad is disposed at a first surface recessed a first vertical distance from the media facing surface;
 wherein one or more first particle trapping holes are disposed between the first leading pad and the second leading pad, wherein a bottom of the one or more first particle trapping holes are disposed a second vertical distance from the media facing surface that is greater than the first vertical distance, wherein the head body further comprises a wall at least partially surrounding a perimeter of the trailing portion and the first and second side pads, wherein the wall is disposed at the first vertical distance, wherein one or more second particle trapping holes are disposed between the wall and the first and second side pads.

2. The head slider of claim 1, wherein the one or more second particle trapping holes are disposed at the second vertical distance.

3. A head slider, comprising:
 a head body having a leading edge, a trailing edge and a media facing surface, the media facing surface having:
  a trailing portion, the trailing portion having first and second side pads disposed at the media facing surface; and
  a leading portion having a first leading pad disposed at the media facing surface;
 the head body also having a second leading pad disposed between the leading edge and the first leading pad, the second leading pad at least partially surrounding the first leading pad, wherein the second leading pad is disposed at a first surface recessed a first vertical distance from the media facing surface;
 wherein one or more first particle trapping holes are disposed between the first leading pad and the second leading pad, wherein a bottom of the one or more first particle trapping holes are disposed a second vertical distance from the media facing surface that is greater than the first vertical distance, wherein the first leading pad has a triangular shaped portion, wherein the triangular shaped portion is at a central position on the first leading pad.

4. The head slider of claim 3, wherein the one or more first particle trapping holes are disposed adjacent the triangular shaped portion of the first leading pad.

5. A head slider, comprising:
 a head body having a leading edge, a trailing edge and a media facing surface, the media facing surface having:
  a trailing portion, the trailing portion having first and second side pads disposed at the media facing surface; and
  a leading portion having a first leading pad disposed at the media facing surface;
 the head body also having a second leading pad disposed between the leading edge and the first leading pad, the second leading pad at least partially surrounding the first leading pad, wherein the second leading pad is disposed at a first surface recessed a first vertical distance from the media facing surface;
 wherein one or more first particle trapping holes are disposed between the first leading pad and the second leading pad, wherein a bottom of the one or more first particle trapping holes are disposed a second vertical distance from the media facing surface that is greater than the first vertical distance, wherein the head body also has a second surface recessed at the second vertical distance, wherein the second surface at least partially surrounds the second leading pad, wherein the head body also has a third surface disposed between the trailing portion and the leading portion, the third surface recessed a third vertical distance from the media facing surface that is greater than the second vertical distance.

6. The head slider of claim 5, wherein the third vertical distance is between about 0.5 μm to 5 μm.

7. A magnetic recording system, comprising:
 an actuator;
 an actuator arm coupled to the actuator;
 a slider coupled to the actuator arm; and
 a head coupled to the slider, the slider comprising:
  a head body having a leading edge, a trailing edge and a media facing surface, the media facing surface having:
   a trailing portion, the trailing portion having first and second side pads disposed at the media facing surface; and
   a leading portion having a first leading pad disposed at the media facing surface;
  the head body also having a second leading pad disposed between the leading edge and the first leading pad, the second leading pad at least partially surrounding the first leading pad, wherein the second leading pad is disposed at a first surface recessed a first vertical distance from the media facing surface;
 wherein one or more first particle trapping holes are disposed between the first leading pad and the second leading pad, wherein a bottom of the one or more first particle trapping holes are disposed a second vertical distance from the media facing surface that is greater than the first vertical distance, wherein the head body further comprises a wall disposed at the first vertical distance, the wall at least partially surrounding a perimeter of the trailing portion and the first and second side pads, wherein one or more second particle trapping holes are disposed between the wall and the first and second side pads.

8. The magnetic recording system of claim 7, wherein the one or more second particle trapping holes are disposed at the second vertical distance.

9. A magnetic recording system, comprising:
an actuator;
an actuator arm coupled to the actuator;
a slider coupled to the actuator arm; and
a head coupled to the slider, the slider comprising:
- a head body having a leading edge, a trailing edge and a media facing surface, the media facing surface having:
  - a trailing portion, the trailing portion having first and second side pads disposed at the media facing surface; and
  - a leading portion having a first leading pad disposed at the media facing surface;
- the head body also having a second leading pad disposed between the leading edge and the first leading pad, the second leading pad at least partially surrounding the first leading pad, wherein the second leading pad is disposed at a first surface recessed a first vertical distance from the media facing surface;
wherein one or more first particle trapping holes are disposed between the first leading pad and the second leading pad, wherein a bottom of the one or more first particle trapping holes are disposed a second vertical distance from the media facing surface that is greater than the first vertical distance, wherein the one or more first particle trapping holes have a width between about 1 μm and 200 μm, wherein the first leading pad has a triangular shaped portion, wherein the triangular shaped portion is at a central position on the first leading pad.

10. The magnetic recording system of claim 9, wherein the one or more first particle trapping holes are disposed adjacent the triangular shaped portion of the first leading pad.

11. A magnetic recording system, comprising:
an actuator;
an actuator arm coupled to the actuator;
a slider coupled to the actuator arm; and
a head coupled to the slider, the slider comprising:
- a head body having a leading edge, a trailing edge and a media facing surface, the media facing surface having:
  - a trailing portion, the trailing portion having first and second side pads disposed at the media facing surface; and
  - a leading portion having a first leading pad disposed at the media facing surface;
- the head body also having a second leading pad disposed between the leading edge and the first leading pad, the second leading pad at least partially surrounding the first leading pad, wherein the second leading pad is disposed at a first surface recessed a first vertical distance from the media facing surface;
wherein one or more first particle trapping holes are disposed between the first leading pad and the second leading pad, wherein a bottom of the one or more first particle trapping holes are disposed a second vertical distance from the media facing surface that is greater than the first vertical distance, wherein the head body also has a second surface recessed at the second vertical distance, wherein the second surface at least partially surrounds the second leading pad, wherein the head body also has a third surface disposed between the trailing portion and the leading portion, the third surface recessed a third vertical distance from the media facing surface that is greater than the second vertical distance.

12. The magnetic recording system of claim 11, wherein the third vertical distance is between about 0.5 μm and 5 μm.

* * * * *